United States Patent Office 3,708,307
Patented Jan. 2, 1973

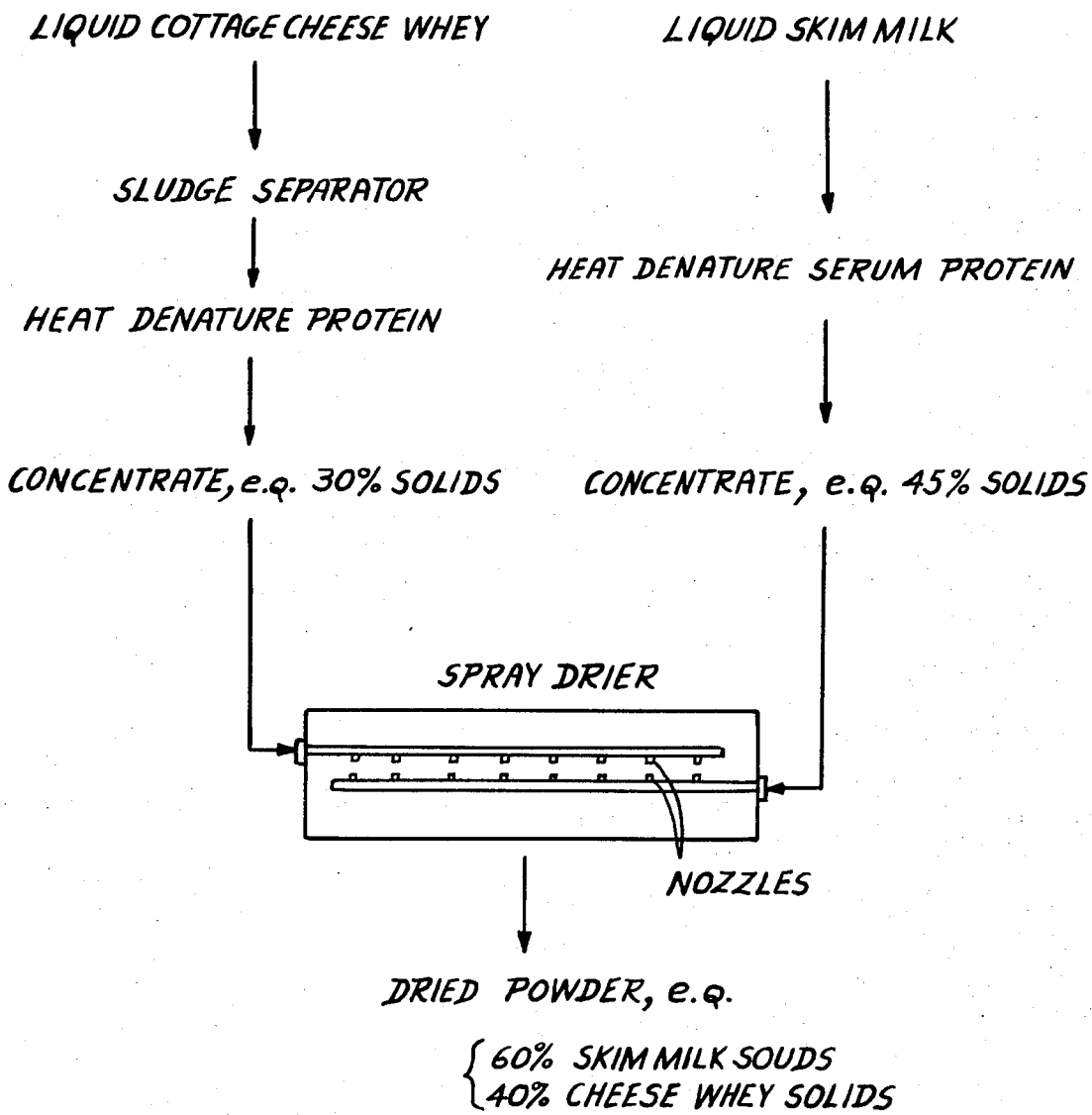

3,708,307
METHOD OF DRYING ACID WHEY AND SWEET SKIM MILK SOLIDS IN COMBINATION
Erik Lundstedt, South Chatham, Mass., assignor to H. P. Hood Sons, Inc., Boston, Mass.
Filed May 15, 1969, Ser. No. 882,954
Int. Cl. A23c 21/00, 1/04
U.S. Cl. 99—57                                  7 Claims

ABSTRACT OF THE DISCLOSURE

Converting acid whey to a useful product by heat denaturing unneutralized acid whey, separately heat denaturing the serum proteins of a liquid milk product containing sweet skim milk and separately atomizing the whey and the milk product simultaneously through separate nozzles in a single dryer. The acid whey solids do not substantially exceed about 43% by weight of the combined acid whey and skim milk solids. The process is characterized by the avoidance of neutralizing the acid whey prior to treatment thus making the dried product suitable for human consumption.

BACKGROUND OF THE INVENTION (1) Field of the invention

This invention relates to food processing and more particularly, to a treatment process for an acid whey by-product resulting from the manufacture of various cheeses.

(2) Description of the prior art

Acid whey having a pH of about 4.6±0.2 is produced in substantial volume as a by-product in the manufacture of Cottage, Bakers, Neufchatel and Cream cheeses. This by-product contains useful nutrients but thus far, no suitable commercial use has been found for it and most of it is discarded as a troublesome waste product with but a minor part being utilized as relatively unprofitable animal feed. Methods devised for drying and using sweet rennet whey and the like have not been adaptable to sour whey due to the high acidity and difficulty of drying the same. For example, if acid whey is concentrated and spray dried in unaltered form, the resulting powder is hygroscopic and adsorbs water. This results in substantial caking at the bottom of the spray dryer making handling of the dried product difficult.

In U.S. Pat. No. 2,602,747 of R. E. Meade, an alternative procedure is proposed for treating acid whey. This procedure utilizes edible whey such as the by-product of cheddar cheese. The whey is first acidulated to pH 4.0 to 5.6 and then neutralized to pH 6.0 to 9.0. Typical neutralizing agents include sodium hydroxide, lime, soda ash, and the like. Following neutralization, the product is heat treated and blended with a heat treated skim milk. It should be noted that if the acid whey had not been neutralized in the preceding step, the acidity of the whey would have caused coagulation of the skim milk making a spraying operation impossible. Following blending of the whey and the skim milk, the mixture is held at an elevated temperature for a substantial period of time before further treatment. Thereafter, the mixture is subjected to concentration by evaporation to produce a concentrate which may contain from about 20 to 40% solids. This concentrate is subjected to acidulation and neutralized using the neutralizing agents noted above and spray dried to produce the final product. It is disclosed in the patent that the product may be used for human consumption such as in standard dough mixes. However, according to the food standards now promulgated by the Pure Food and Drug Administration, the dried product would not conform to any standard of identity for whey because of the neutralization products which it contains.

STATEMENT OF THE INVENTION

The present invention overcomes the problems of the prior art and provides an economical process for converting acid whey to a useful product suitable for human consumption. The process comprises the steps of heat denaturing unneutralized, acid whey, separately heat denaturing the serum proteins of a liquid milk product containing sweet, skim milk and spray drying the mixture by separately atomizing the whey and the milk products simultaneously through separate nozzles in a single spray dryer. The whey and milk products are fed to the spray dryer in quantities such that the acid whey solids do not substantially exceed above 43% by weight of the combined acid whey and skim milk solids. The process is characterized by an absence of a neutralization step thereby avoiding the presence of neutralization products in the dried product. The product of the process is a free-flowing, non-hygroscopic powder suitable for human consumption such as for use in the baking industry for the making of bread, cake and the like.

DESCRIPTION OF THE DRAWING

In the drawing, there is represented a flow diagram illustrating the currently preferred form of the invention.

DESCRIPTION OF THE PREFERRED EMBODIMENTS

In accordance with the invention, cheese whey and skim milk, heat treated to produce at least 80% of the serum proteins in a denatured state can be spray dried simultaneously but separately in the same spray drier. Acid whey can be employed up to a maximum weight ratio of about 43 parts acid whey solids to 57 parts skim milk solids and preferably is employed in the ratio of 2 to 3. While higher amounts of skim milk can be employed, it is economically desired that near maximum amounts of acid whey be employed. It is doubtful that small amounts, for example five percent or less whey solids, would be of value. The invention will be more fully illustrated by the following examples where acid whey and liquid skim milk are separately processed and separately atomized in the same spray drier to produce a free-flowing, non-hygroscopic powder as follows.

Fresh cottage cheese whey at a pH of 4.5 was pumped through stainless steel pipes from cheese vats to a 30,000 pound per hour self-opening sludge separator set for hourly automatic discharge to separate the casein dust from the whey. This separation was found desirable since the presence of heated casein particles will clog the screen to the homogenizer and the spray nozzles. The casein-free whey was then passed through a pressurized hot well in which the whey was heated to 222° F. for two minutes or its equivalent in time and temperature to heat denature at least 80% of the albumins and globulins. The whey was then condensed to 30% solids in a two-stage vacuum evaporator, withdrawn and stored in a separate vat at 115° F. After cleaning the lines with water, skim milk was heated to 222° F. in the above hot well for two minutes to heat denature the serum proteins thereof and then condensed in the same evaporator to about 45% solids or approximately 22° Bé. at the exit temperature of 115° F.

The two condensed products were then connected to separate homogenizers or positive pumps set to deliver a constant volume at 1500 pounds pressure. The whey was conducted at 115° F. to the top nozzle sections of the Roger's Drier, and the skim milk was delivered at the bottom nozzles being heated to 160° F. The drier was a five header 600 series drier with No. 20 spray nozzles with No. 66 core inserts. The inlet temperature in the spray drier was 330° F. and the outgoing air was 193° F. The yield was 1700 pounds of whey-skim milk powder per hour, compared to 3000 pounds per hour yield of skim milk powder by the same apparatus operating at 2000 pounds pressure. The operation of the drier was the same as for drying skim milk excepting for the use of the lower pressure which was considered desirable to provide somewhat increased drying time for the whey. While the two sets of spray nozzles are shown for convenience in accompanying drawing as being fed from opposite sides, they are fed from the same side in the actual drier.

The dried powder was removed from the bottom of the drier by scrapers and passed via conveyors to sifters and baggers. The powder was somewhat lighter in color than dried skim milk, was free-flowing and non-hygroscopic, and was readily dispersible in water. Inspection of the particles indicated that the droplets of the two liquids coalesce in drying. It is believed that the more rapidly drying skim milk particles absorb the tacky whey droplets and facilitate drying. The resulting unitary character of the particles prevents separation and stratification of the powder during storage and transit. The casein of the skim milk is not coagulated in the drier since evaporation of water keeps the temperature below the coagulation temperature provided excess whey is not employed.

The powder produced as described above contains about 26% protein and 60% lactose and has solids derived from acid whey and skim milk in the ratio of 2 to 3 or 40% and 60%, respectively. It therefore represents a dried mixture of equal volumes of skim milk with 9% solids and acid whey with 6% solids. It has a pH, on reconstitution, of about 5.5 and a casein coagulation temperature of about 130° F. Products according to this invention should not have a pH substantially less than 5.5.

The above powder was found suitable for the making of bakery products and produced bread comparable to products made with plain skim milk solids on a 3% level of the flour. The lower pH permitted its use in the continuous bread making process where skim milk solids (pH 6.5) cannot now be employed. Amounts greater than 3% can be employed if desired.

The concentration by partial evaporation above described is preferred but not essential. Any suitable concentrating apparatus can be employed and the whey and skim milk can be concentrated to any desired extent. The 30% and 45% above suggested is economical, convenient on existing equipment, and permits feeding to the drier in equal volume. Moreover, concentrating is a convenient means of equalizing solids content for products from different sources. Any suitable means for heat-denaturing at least 80% of the serum protein, as specified by bakeries, can also be used. The feed temperatures of the two concentrates may be varied as desired. The use of the same denaturing and concentrating equipment with storage of one concentrate is merely for use of existing equipment and economy, and completely separate lines can be used if desired.

While the preferred starting materials are cottage cheese whey and skim milk, any acid whey having the requisite pH can be also employed. Any milk product containing sweet skim milk solids at about pH 6.5 can be used, for example, whole milk or sweet buttermilk. Where whole milk or sweet buttermilk are employed, they are employed in quantity sufficient to provide in the final product the desired amount of the skim milk fraction solids relative to the dried whey solids.

Products prepared as above described meet the bakery industry requirements that dairy ingredients contain no artificial chemicals or neutralizers; that the serum protein, that is, the albumin and globulin fractions, be heat denatured to the extent of at least 80% thereof; and that the finished product be non-hygroscopic and non-curdling at temperatures up to 130° F.

It should be understood that the foregoing description is for the purpose of illustration and that the invention includes modifications within the scope of the appended claims.

I claim:

1. The method of preparing a dried dairy product suitable for bakery use and containing acid whey, said method comprising the steps:
   heat denaturing unneutralized acid whey,
   separately heat denaturing the serum proteins of a liquid milk product containing sweet skim milk solids, and
   spray drying to form a powder containing a mixture of said acid whey and milk product by separately atomizing the denatured unneutralized acid whey and the denatured milk product simultaneously in a single drier whereby the droplets of the milk product and the acid whey coalesce in drying so that the drying milk product particles absorb the whey droplets to form particles which are unitary in character and where the casein of the milk product is not coagulated, the whey and milk product being fed in quantities to the spray drier such that the acid whey solids are from about 5% to about 43% by weight of the combined acid whey and skim milk solids, said dried dairy product being non-hygroscopic and having a minimum pH of about 5.5 upon reconstitution.

2. The method according to claim 1 wherein said acid whey has a pH of about 4.6±0.2, and said milk product is selected from the group consisting of whole milk, skim milk and sweet buttermilk.

3. The method according to claim 1 wherein said acid whey is cottage cheese whey and said milk product is skim milk.

4. The method according to claim 3 wherein said whey and skim milk are spray dried in a ratio of about 60% skim milk solids and about 40% acid whey solids.

5. The method according to claim 2 wherein said acid whey and liquid milk product are concentrated prior to spray drying to about 30% solids and 45% skim milk solids, respectively, and said concentrates are fed into said drier in about equal volume.

6. The method according to claim 1 wherein suspended casein solids are removed from said acid whey prior to heat denaturing the same.

7. The method of preparing a dried dairy product comprising cottage cheese acid whey solids suitable for bakery use, said method comprising the steps;
   separating suspended casein solids from cottage cheese whey,
   heat denaturing the protein of said acid whey without neutralizing the same,
   separately heat denaturing the serum protein of skim milk,
   separately concentrating the whey and skim milk to about 30% and 45% solids by weight, respectively, and
   spray drying to form a powder containing a mixture of said whey and skim milk by separately atomizing the heat denatured unneutralized acid whey and the heat denatured skim milk simultaneously in a single drier whereby the droplets of the skim milk and the acid whey coalesce in drying so that the drying skim milk particles absorb the whey droplets to form particles which are unitary in character and where the casein of the skim milk is not coagulated, the acid whey and skim milk being fed in quantities to the spray drier such that the acid whey solids are from about 5% to about 43% by weight of the combined acid whey and skim milk solids, said dried dairy products being non-hygroscopic and having a minimum pH of about 5.5 upon reconstitution.

(References on following page)

References Cited

UNITED STATES PATENTS

| | | | |
|---|---|---|---|
| 2,602,746 | 7/1952 | Meade | 99—57 X |
| 2,602,747 | 7/1952 | Meade | 99—57 X |
| 3,121,639 | 2/1964 | Bauer et al. | 99—203 |

A. LOUIS MONACELL, Primary Examiner

D. M. NAFF, Assistant Examiner

U.S. Cl. X.R.

99—199, 203